Patented Feb. 24, 1925.

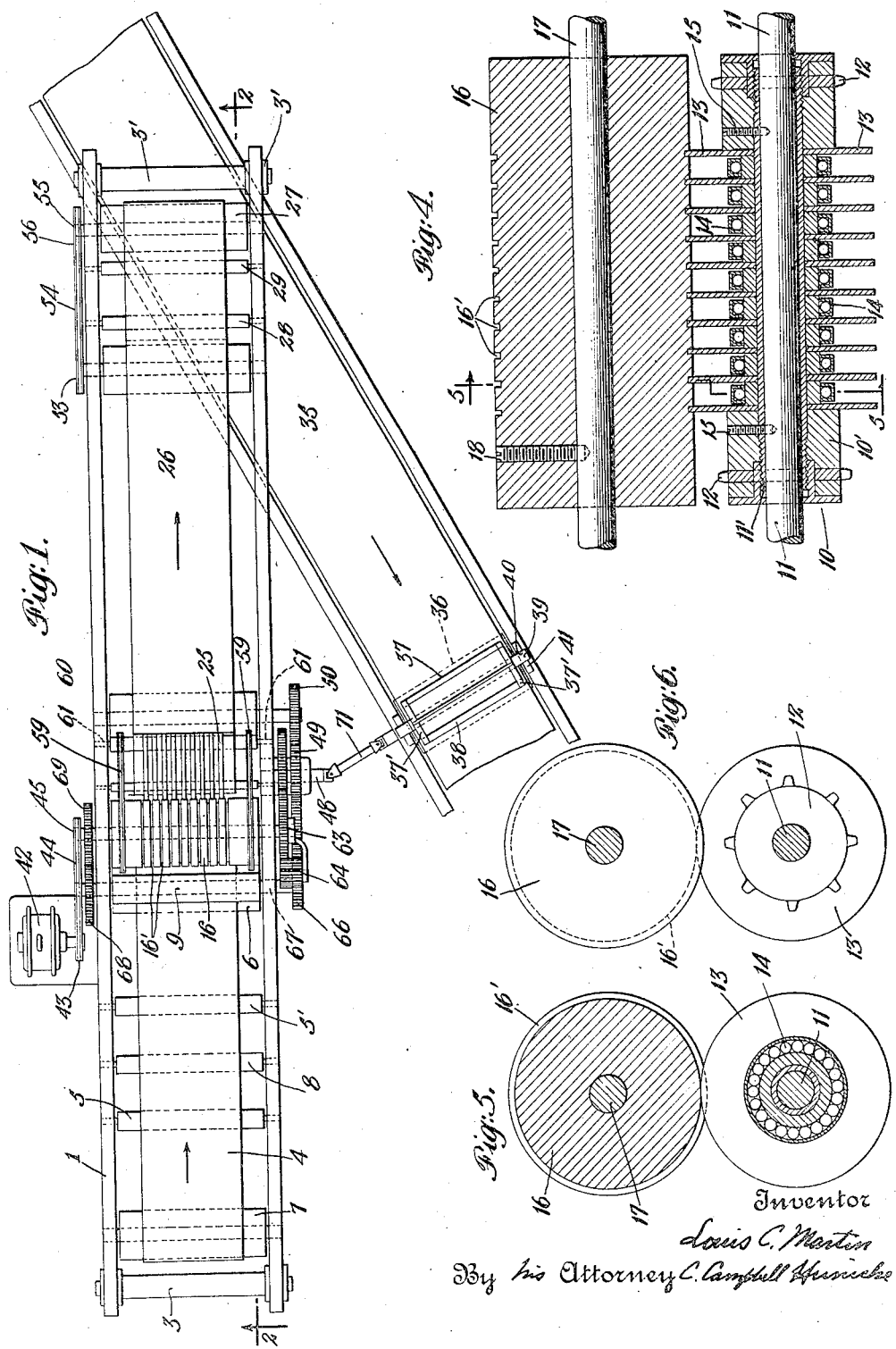

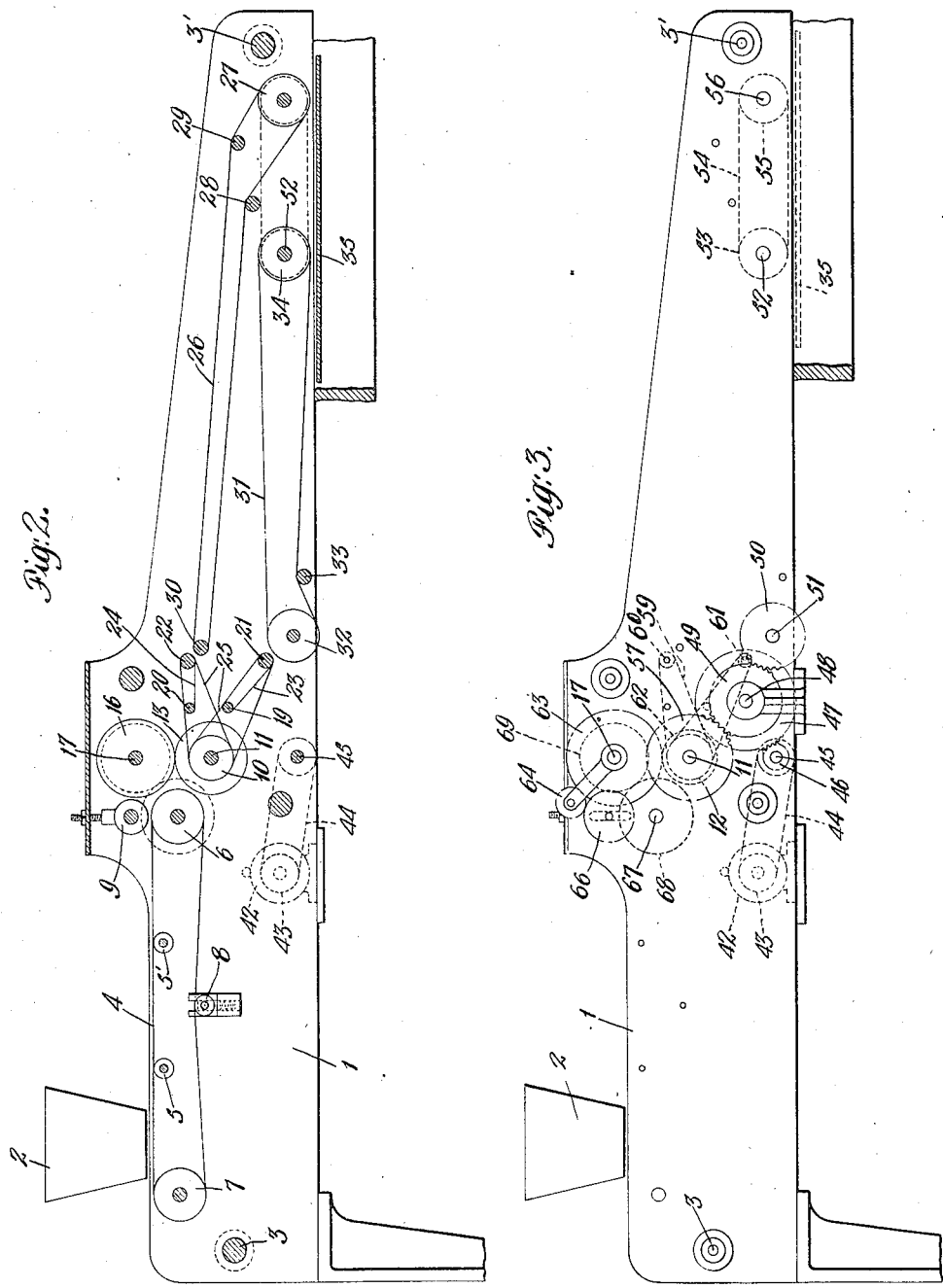

1,527,262

UNITED STATES PATENT OFFICE.

LOUIS C. MARTIN, OF AMITYVILLE, NEW YORK.

GRISSINI-MAKING MACHINE.

Application filed February 19, 1924. Serial No. 693,742.

*To all whom it may concern:*

Be it known that I, LOUIS C. MARTIN, a citizen of the United States, and resident of Amityville, Long Island, in the county of Suffolk and State of New York, have invented certain new and useful Improvements in Grissini-Making Machines, of which the following is a specification.

This invention relates to a machine for making grissini.

Attempts have been made to make grissini by machine but such attempts have generally been unsuccessful due to the peculiar properties of the dough and to wastage of dough in the machine. Grissini dough although elastic, is very brittle under jar or sudden stress and when broken cannot be joined. Grissini are usually made by hand, being drawn by the baker into strips of approximately 27 inches in length. The manufacture of grissini by hand makes them expensive.

Among the objects of this invention are to provide a machine capable of making grissini with but little waste. Other objects are to provide a machine of simple construction, easily repaired and inexpensive to operate.

Referring to the drawings:

Figure 1 is a plan view of the machine.

Figure 2 is a longitudinal section along the line 2, 2, looking in the direction of the arrows of Figure 1.

Figure 3 is a view in side elevation of the machine.

Figure 4 is a detail view in cross section of the cutters and guide roll.

Figure 5 is a cross sectional view along the lines 5, 5, looking in the direction of the arrows of Figure 4.

Figure 6 is a cross sectional view along the line 6, 6, looking in the direction of the arrows of Figure 4.

In carrying out my invention I propose to provide a frame or casing 1 enclosing the mechanisms. At one end of frame 1, hopper 2, of the dough mixing machine (not shown) is attached. Below hopper 2, I provide a brace 3 and I provide a corresponding brace 3' at the other end of frame 1. Leading from below hopper 2, in frame 1 is a travelling belt 4 upon which the dough falls. It is important that the supporting belt for the dough be at all times taut and I therefore provide intermediate idle rollers, 5, 5', to support the belt between driver roller 6 and driven roller 7. On the return side of the travelling belt is an adjustable tension roller 8 to take up any slack and maintain the belt taut. Above the driving roller 6, I provide a roller 9 to reduce the dough to the proper predetermined height or thickness on the belt. Roller 9 may be positively driven if desired by means of travelling gear 64. Adjacent the driving roller 6 and a little below it is cutter roller 10. (See Fig. 4.) Roller 10 is journaled on shaft 11 to rotate therewith. Roller 10 comprises wood roll 10', inner metal sleeve 11', sprocket wheels 12, cutters 13 and ball races, balls and housings forming pulley 14. Roller 10 is secured to shaft 11 by set screws 15. Above roller 10 is guide roller 16, secured to shaft 17 by means of set screw 18. The periphery of roller 16 has grooves 16' for cutters 13. The dough must be sheared. Roller 16 and roller 10 rotate in opposite directions in order to keep the cutters clean.

Roller 10 is driven at about the same speed as belt 4. Adjacent to cutting roller 10 are rollers 19, 20, 21 and 22. Around rollers 19 and 21 is a travelling belt 23 and around rollers 20 and 22 is another travelling belt 24. Narrow travelling belts 25 operate around the pulleys 14, and the alternate belts operating over belt 23 and the others around belt 24. The function of the small belting is to bridge the gap from the cutters 13 to the wide belts 23 and 24. The narrow belts 25 rest upon the wide belts 23 and 24. Adjacent the travelling belts 25 and 23 is travelling belt 26 supported by driving roller 27, and adjustable idle rollers 28, 29 and driven roller 30. Likewise, adjacent to belts 25 and 24 is a corresponding travelling belt 31 supported by driving roller 32 and adjustable idler 33 and driven roller 34. Below belts 26 and 31 and at an angle of approximately 30 degrees is travelling belt 35 which is driven by roller 36. Belt 35 travels through the oven and its speed is just sufficient to properly cook the grissini while passing therethrough. The belts 35, 26 and 31 all operate at the same speed which is greater than the speed of belts 23, 24 and 25, and about nine times as great as belt 4. Roller 10 has a greater speed than belt 4 and the belts 25 and remaining belts travel at a greater speed than roller 10. This difference of speed is so adjusted as to draw the dough the proper amount.

Adjacent to belts 26 and 31 but over belt 35 is cutter 37 which is driven by the friction of its disk ends 37' upon belt 35. The disk ends carry four removable cutting blades 38 near their rims. The circular distance between the blades 38 is 27 inches. A shaft 39 is secured to the disks 37' and extends beyond them into slots 40 of frame 41.

The machine is driven by motor 42 through belting and pulleys 43, 44 to drive shaft 45 which carries gear 46, the latter, driving gear 47 on shaft 48 carried by frame 1. Journaled to shaft 48 is gear 49 to rotate therewith. Gear 49 drives gear 50 which is carried by shaft 51 and through belt 31 drives roller 34 and its shaft 52 which carries sprocket gear 53 which in turn drives through sprocket chain 54, sprocket gear 55 secured to shaft 56 of roller 27. Gear 49 also drives gear 57 carried by cutter shaft 11 carrying roller 10 with its sprocket wheels 12 which latter through chains 58, 59 drive corresponding sprocket gears 12' carried by rollers 20, 22 on shafts 60, 61. Gear 62 carried by shaft 11 drives gear 63 carried by shaft 17. Pivotal or travelling gear 64 is driven by gear 63 to drive gear 66. Belt 4 is driven by roller 6 through shaft 67 carrying gear 68 which in turn is driven by gear 69 carried by shaft 17. Belt 35 is driven by driving roller 36 which in turn is driven through universal joint 71 carried by shaft 48. Modifications of the gear train may be made and still fall within the scope of my invention.

The operation of the device is as follows: Dough is fed out of hopper 2 upon belt 4 which transports it to and under roller 9 which irons it out to the proper thickness and the dough then drops onto the cutting roller 10 where it is cut into thin strips and as the dough passes through the cutter it is elongated by reason of the greater speed of the pulley belts and carrier belt. The thin strips are alternately carried from the cutter by belts 25 to belts 23 and 24 which in turn deliver the strips respectively to travelling belts 26 and 31. These latter deliver to belt 35 which is at a 30 degree angle in the horizontal plane in order to maintain the grissini separated. The grissini are cut into proper lengths by cutter 37 upon belt 35 adjacent the oven. The reason for the position of the cutter adjacent the oven is to permit the dough to become set before cutting.

It will thus be seen that I have devised a mechanism for making grissini that is clean, effective, and efficient.

What I claim is:

1. In a machine for making grissini a cutter roller carrying circular knives, ball bearing pulleys on said cutter roller between said circular knives and travelling belts operating aforesaid ball bearing pulleys to deliver, support and stretch the grissini from the cutter roller.

2. In a machine for making grissini means for delivering grissini dough to a cutter roller for cutting the grissini dough into strips, means for delivering said strips to travelling carrier belts, said carrier travelling belts delivering to an oven travelling belt, said oven travelling belt being at an acute angle in the horizontal plane to said carrier belts and means for driving said belts.

3. In a machine for making grissini a travelling belt for delivering grissini dough to a cutter roller, means for reducing the thickness of the dough on the travelling belt and distributing it thereon, a cutter roller carrying circular knives to cut the dough into strips, a roller above said cutter roller and rotating in the opposite direction thereto and having grooves on the periphery of the roller co-operating with the circular knives to shear the dough, ball bearing pulleys on said cutter roller between said knives, travelling belts operating over said ball bearing pulleys to deliver the cut dough to carrier belts, said carrier belts being in different planes and receiving from alternate pulley travelling belts and delivering to an oven travelling belt, said oven travelling belt being at an acute angle in the horizontal plane to said carrier belts and means for driving said cutter roller and travelling belts.

4. In a machine for making grissini a travelling belt for delivering grissini dough to a cutter roller, means for reducing the thickness of the dough on the travelling belt and distributing it thereon, a cutter roller carrying circular knives to cut the dough into strips, a roller above said cutter roller and rotating in the opposite direction thereto and having grooves on the periphery of the roller co-operating with the circular knives to shear the dough, ball bearing pulleys on said cutter roller between said knives, travelling belts operating over said ball bearing pulleys to deliver the cut dough to carrier belts, said carrier belts being in different planes and receiving from alternate pulley travelling belts and delivering to an oven travelling belt, said oven travelling belt being at an acute angle in the horizontal plane to said carrier belts and means for cutting said strips of grissini into lengths on said oven travelling belt, and a train of gearing to drive said travelling belts and cutter roller.

Signed at New York, in the county of New York and State of New York, this 9th day of February A. D. 1924.

LOUIS C. MARTIN.